(12) United States Patent
Hawkins

(10) Patent No.: US 6,170,990 B1
(45) Date of Patent: Jan. 9, 2001

(54) TRUNNION BUSHING

(75) Inventor: James T. Hawkins, Cincinnati, OH (US)

(73) Assignee: General Electric Company, Cincinnati, OH (US)

(*) Notice: Under 35 U.S.C. 154(b), the term of this patent shall be extended for 0 days.

(21) Appl. No.: 09/243,725

(22) Filed: Feb. 3, 1999

(51) Int. Cl.⁷ .................................................. F16C 33/04
(52) U.S. Cl. ........................ 384/297; 384/277; 384/276; 384/907.1; 384/911
(58) Field of Search ................................. 384/277, 276, 384/275, 297, 298, 299, 300, 907, 907.1, 911, 908, 909

(56) References Cited

U.S. PATENT DOCUMENTS

| | | | |
|---|---|---|---|
| 2,642,370 | * 6/1953 | Parsons et al. | 384/908 X |
| 2,907,612 | * 10/1959 | White | 384/298 |
| 3,533,668 | * 10/1970 | Tunis, III | 384/298 |
| 3,654,028 | * 4/1972 | Goldsworthy | 156/438 |
| 3,873,168 | * 3/1975 | Viola et al. | 384/298 |
| 4,008,787 | * 2/1977 | Whitt | 184/12 |
| 4,263,361 | * 4/1981 | Hodes et al. | 428/240 |
| 4,431,698 | * 2/1984 | Case et al. | 428/244 |
| 5,759,699 | * 6/1998 | French | 428/447 |
| 5,810,562 | * 9/1998 | Byrnes et al. | 416/114 |
| 5,911,514 | * 6/1999 | Davies et al. | 384/300 |

* cited by examiner

Primary Examiner—Thomas R. Hannon
(74) Attorney, Agent, or Firm—Andrew C. Hess; Nathan D. Herkamp

(57) ABSTRACT

Corrosion is avoided in variable stator vanes through the use of an outer trunnion bushing that eliminates the galvanic corrosion potential of conventional bushings. The bushing has a plurality of layers arranged concentrically so as to include an innermost layer and an outermost layer. The innermost layer is made of a braided graphite composite laminate material, and the outermost layer is made of a non-galvanic material.

15 Claims, 1 Drawing Sheet

1

TRUNNION BUSHING

BACKGROUND OF THE INVENTION

This invention relates generally to variable stator vane outer trunnion bushings used in gas turbine engines and more particularly to a variable stator vane outer trunnion bushing that eliminates the galvanic corrosion potential of conventional bushings.

A typical gas turbine engine compressor includes several rows or stages of compressor stator vanes and corresponding rows or stages of compressor rotor blades therebetween. As ambient air flows through each succeeding compressor stage during operation, it is successively compressed for providing compressed air to a combustor located downstream therefrom wherein it is mixed with fuel and ignited for generating hot combustion gases that power the engine.

To improve the overall operation of the compressor, several compressor stator vanes are rotatively mounted to allow each vane to rotate around its longitudinal or radial axis to adjust the angular orientation of the vane relative to the airflow thereover. Such variable stator vanes include an integral outer trunnion disposed in a complementary mounting boss in the stator casing for allowing rotation of the vane relative to the casing. A lever arm is fixedly joined to a coaxial stem extending outwardly from the vane trunnion. The distal end of the lever arm is operatively joined to an actuation ring that controls the angle of the vane. All of the vane lever arms in a single row are joined to a common actuation ring for ensuring that all of the variable vanes are positioned relative to the airflow in the compressor stage at the same angular orientation.

Variable stator vane assemblies include a bushing disposed between the outer trunnion and the casing mounting boss to decrease the coefficient of friction therebetween and prevent wear of the trunnion and casing. These bushings are generally made by compression molding techniques using high temperature polyimide resin and braided graphite composite laminate. Often the bushings are designed with very small tolerances that require finish grinding to bring the dimensional tolerances into acceptance. The finish grinding can result in the exposure of graphite fibers, which, upon installation of the bushing into the mounting boss, come into direct contact with the bare steel surface thereof.

During operation of the engine, corrosive species, such as salt water, can infiltrate crevices and gaps between the bushing and the mounting boss, thereby creating a galvanic cell between these two dissimilar metals. This can lead to the formation of galvanic species and oxides such as rust between the bushing and the mounting boss. Excessive rust formation will squeeze the bushing, causing it to be reduced in size to the point that it will pinch the trunnion, thereby preventing the desired rotational operation of the variable stator vane assembly.

Accordingly, there is a need for variable stator vane outer trunnion bushing that eliminates the galvanic corrosion potential of conventional bushings.

SUMMARY OF THE INVENTION

The above-mentioned needs are met by the present invention which provides a bushing having a plurality of layers arranged concentrically so as to include an innermost layer and an outermost layer. The innermost layer is preferably made of a braided graphite composite laminate material, and the outermost layer is preferably made of a non-galvanic material.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
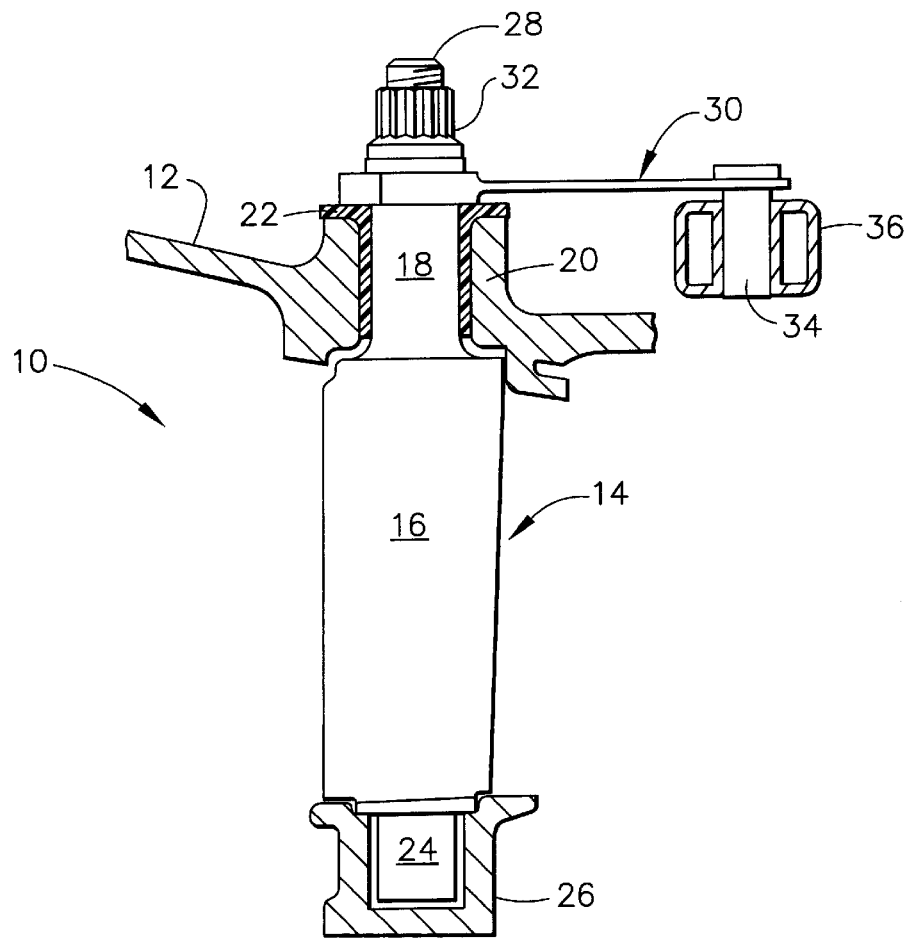
FIG. 1 is a sectional view of a variable stator vane assembly having the trunnion bushing of the present invention.

Referring to the drawings wherein identical reference numerals denote the same elements throughout the various views, FIG. 1 shows a variable stator vane assembly 10 secured to a compressor casing 12. The variable stator vane assembly 10 includes a plurality of circumferentially spaced apart variable stator vanes 14. Each vane 14 includes a conventional airfoil 16 having a leading edge, a downstream trailing edge, and pressure and suction sides extending therebetween.

Each vane 14 further includes a radially outer trunnion 18 extending coaxially and integrally outwardly from the top of the airfoil 16 for pivotally mounting the vane 14 in a corresponding mounting boss 20 formed in the compressor casing 12. A trunnion bushing 22 is disposed between the outer trunnion 18 and the mounting boss 20 to decrease the friction and wear therebetween. In the exemplary embodiment illustrated in FIG. 1, each vane 14 also includes a radially inner trunnion 24 mounted in a sealing ring 26, although other arrangements could be used.

An integrally formed mounting stem 28 extends radially outwardly from an outer distal end of the outer trunnion 18. The mounting stem 28 has a threaded portion and a seating portion formed thereon. A lever arm 30 is placed, at one end thereof, over the mounting stem 28 for engagement with the seating portion thereof. A nut 32 is threaded onto the threaded portion of the mounting stem 28 to secure the lever arm 30 thereto so that rotational movement of the lever arm 30 will be transferred to the vane 14. An actuation pin 34 is disposed at the other end of the lever arm 30 and is received in a complementary hole in an annular actuation ring 36, which controls the position of the lever arm 30. The lever arms of each stator vane 14 are connected to the actuation ring 36 so that the orientation of the vanes 14 can be adjusted in unison.

Figure 2:
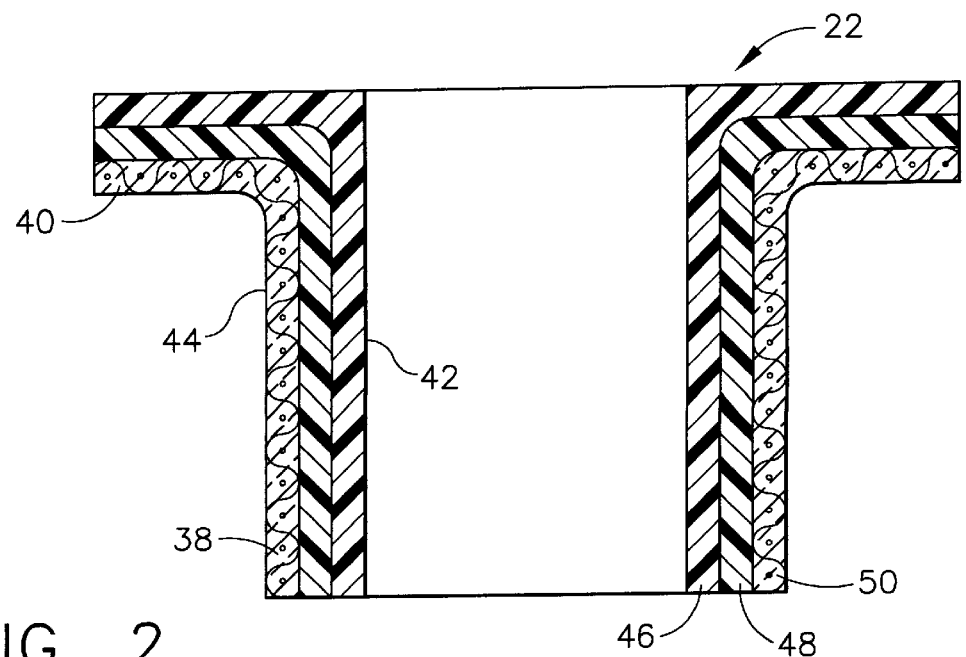
FIG. 2 is a sectional view of the trunnion bushing of the present invention.

FIG. 2 shows the trunnion bushing 22 in more detail. The bushing 22 includes a cylindrical sleeve 38 and an annular flange 40 formed on one end of the sleeve 38. The sleeve 38 has an inner surface 42 for contacting the outer trunnion 18 and an outer surface 44 for contacting the interior of the mounting boss 20 formed in the compressor casing 12. The flange 40 fits over the outer edge of the mounting boss 20 to retain the bushing 22 in place with respect to the longitudinal axis of the outer trunnion 18.

The bushing 22 comprises multiple layers to achieve the desired bushing thickness. As shown in FIG. 2, bushing 22 includes three layers 46, 48 and 50. The plural layers are arranged concentrically so as to define an innermost layer 46, an intermediate layer 48, and an outermost layer 50. It should be noted that while three layers are shown in FIG. 2, this is for purposes of illustration only; the present invention could be configured with just an innermost layer and an outermost layer (i.e., no intermediate layer), or additional intermediate layers could be included.

The innermost layer 46 forms the inner surface 42 that contacts the outer trunnion 18 and should be able to accommodate the relative rotation between the bushing 22 and the outer trunnion 18. Accordingly, the innermost layer 46 is preferably made of a durable, wear resistant material such as a composite laminate made of braided graphite fibers impregnated with a high temperature polyimide resin system. Braided graphite is a readily available material that is strong and provides excellent wear resistance due to its low coefficient of friction. Graphite in general also provides excellent thermal stability and chemical resistance.

The outermost layer 50 forms the outer surface 44 that contacts the interior of the mounting boss 20 formed in the compressor casing 12. As mentioned above, the interface of conventional bushings and compressor casings, which are commonly made of steel, is susceptible to becoming a galvanic cell upon the ingress of a corrosive species such as salt water. Accordingly, the outermost layer 50 is preferably made of a non-galvanic material. As used herein, the term "non-galvanic" refers to a material that is incapable of forming a galvanic cell with the compressor casing 12.

While any non-galvanic material could be used for the outermost layer 50, preferred non-galvanic materials include a composite laminate made of braided glass fibers, astroquartz filaments, aramid fibers as sold under the trademark Kevlar, or quartz filaments impregnated with a high temperature polyimide resin system, or various synthetic resins. Perhaps most preferred of these materials is braided glass, which is a strong, commonly available and relatively inexpensive nongalvanic material. Furthermore, braided glass is more robust than other materials such as synthetic resins in that it is better able to withstand the rigors of use in a gas turbine engine. For instance, engine vibrations could cause graphite fibers from inner layers of the bushing to penetrate the outermost layer 50 and create the possibility of a galvanic cell being formed with the compressor casing 12. Braided glass is believed to be among the better materials at resisting fiber penetration because of engine vibrations or for any other reason.

The intermediate layer 48 can be made of either braided graphite or a non-galvanic material, depending on the particular application. For example, if a high degree of wear resistance is required, than the intermediate layer 48 could be made of braided graphite. But if more protection against corrosion was desired, then the intermediate layer 48 could be made of a non-galvanic material. The same principles would apply if additional intermediate layers were utilized.

The foregoing has described a trunnion bushing for variable stator vanes that retains a high degree of wear resistance while eliminating the galvanic corrosion potential of conventional bushings. While specific embodiments of the present invention have been described, it will be apparent to those skilled in the art that various modifications thereto can be made without departing from the spirit and scope of the invention as defined in the appended claims.

What is claimed is:

1. A bushing comprising a plurality of layers arranged concentrically so as to include an innermost layer and an outermost layer, said innermost layer comprising a composite material including braided graphite and said outermost layer comprising a non-galvanic material.

2. The bushing of claim 1 wherein said non-galvanic material comprises a composite material including braided glass.

3. The bushing of claim 1 wherein said non-galvanic material comprises a composite material including aramid fibers.

4. The bushing of claim 1 wherein said non-galvanic material comprises a composite material including quartz filaments.

5. The bushing of claim 1 wherein said plurality of layers is formed into a sleeve having an annular flange formed on one end thereof.

6. The bushing of claim 1 wherein said plurality of layers includes at least one intermediate layer disposed between said innermost layer and said outermost layer.

7. The bushing of claim 6 wherein said intermediate layer comprises a non-galvanic material.

8. The bushing of claim 6 wherein said intermediate layer comprises a composite material including braided graphite.

9. A bushing comprising:

a cylindrical sleeve; and an annular flange formed on one end of said cylindrical sleeve, wherein said cylindrical sleeve and said annular flange comprise a plurality of layers arranged concentrically so as to include an innermost layer and an outermost layer, said innermost layer comprising a composite material including braided graphite and said outermost layer comprising a non-galvanic material.

10. The bushing of claim 9 wherein said non-galvanic material comprises a composite material including braided glass.

11. The bushing of claim 9 wherein said non-galvanic material comprises a composite material including aramid fibers.

12. The bushing of claim 9 wherein said non-galvanic material comprises a composite material including quartz filaments.

13. The bushing of claim 9 wherein said plurality of layers includes at least one intermediate layer disposed between said innermost layer and said outermost layer.

14. The bushing of claim 13 wherein said intermediate layer comprises a non-galvanic material.

15. The bushing of claim 13 wherein said intermediate layer comprises a composite material including braided graphite.

* * * * *